United States Patent [19]

Henry et al.

[11] Patent Number: 4,603,255

[45] Date of Patent: Jul. 29, 1986

[54] FIRE AND EXPLOSION PROTECTION SYSTEM

[75] Inventors: Richard V. Henry, Flintridge, Calif.; David N. Ball, Buckingham; Robert L. Farquhar, Berkshire, both of England; Vincent M. Rowe; Peter L. Hutchins, both of Santa Ana, Calif.

[73] Assignee: HTL Industries, Inc., Arcadia, Calif.

[21] Appl. No.: 591,623

[22] Filed: Mar. 20, 1984

[51] Int. Cl.[4] .............................................. G01J 1/00

[52] U.S. Cl. .................................. 250/339; 250/342; 250/349

[58] Field of Search ..................... 250/338.1, 339, 342, 250/349; 340/578

[56] References Cited

U.S. PATENT DOCUMENTS

| | | | |
|---|---|---|---|
| 3,147,380 | 9/1964 | Buckingham et al. . | |
| 3,524,984 | 8/1970 | Fothergill et al. . | |
| 3,665,440 | 5/1972 | McMenamin . | |
| 3,718,918 | 2/1973 | Fothergill et al. . | |
| 3,789,384 | 1/1974 | Akers . | |
| 3,825,754 | 7/1974 | Cinzori et al. | 250/338 |
| 3,831,318 | 8/1974 | Richmond . | |
| 3,859,520 | 1/1975 | Hertzberg et al. . | |
| 3,931,521 | 1/1976 | Cinzori . | |
| 4,160,163 | 7/1979 | Nakauchi . | |
| 4,206,454 | 6/1980 | Schapira et al. . | |
| 4,220,857 | 9/1980 | Bright . | |
| 4,414,542 | 11/1983 | Farquhar et al. . | |
| 4,421,984 | 12/1983 | Farquhar et al. . | |

*Primary Examiner*—Janice A. Howell
*Attorney, Agent, or Firm*—John K. Williamson

[57] ABSTRACT

A fire or explosion detection system is disclosed for reliably discriminating between a hydrocarbon fire in an armored vehicle and other sources of radiant energy including explosion of an armor-piercing ammunition round without an accompanying hydrocarbon fire. Radiation detectors sensitive to radiation at 4.4 microns and 0.9 microns, respectively, each produce logic outputs if the viewed radiation intensity exceeds a predetermined relatively low threshold and, in the case of the 4.4 micron detector, is rising at least a predetermined rate or, in the case of the 0.9 micron detector, is not falling at more than a predetermined rate. The logic outputs are fed to a coincidence gate which produces a fire- or explosion-indicating output only if all of the outputs are received concurrently for at least a predetermined period of time. A third radiation detector, in combination with the 0.9 micron detector, measures the color temperature of the radiation source being monitored, and inhibits the coincidence gate if the color temperature exceeds a predetermined value. Further discriminating capability is provided in the form of a medium threshold unit operable to produce an inhibit signal for a relatively short period of time if the output of the 0.9 micron detector exceeds a medium-level threshold.

32 Claims, 11 Drawing Figures

FIRE AND EXPLOSION PROTECTION SYSTEM

BACKGROUND OF THE INVENTION

The invention relates to fire and explosion detection systems and more specifically to systems which are able to discriminate between fires and explosions which need to be detected and those which do not. For example, systems embodying the invention may be used in situations where it is required to discriminate between (a) a first case where radiation is produced by the explosion or burning of an explosive or incendiary ammunition round striking the protective skin or armor of a vehicle or the like, such as a battle tank, and (b) a second case where radiation is produced by a fire or explosion of combustible or explosive material (such as hydrocarbons) which is set off by such ammunition round. The system is arranged so as to detect the second case but not the first case, and in this way can initiate action to suppress the fire or explosion in the second case but not initiate such suppression action in response to the first case. For example, such a system may be used for protecting regions adjacent to the fuel tanks (and fuel lines and hydraulic systems) in armored vehicles which may be attacked by high explosive anti-tank (H.E.A.T.) ammunition rounds. In such an application, the system is arranged to respond to hydrocarbon fires (that is, involving the fuel or hydraulic fluid carried by the vehicle) as set off by such ammunition rounds, but not to detect either the explosion of the round itself or any secondary non-hydrocarbon fire produced by a pyrophoric combustion of materials from the armor of the vehicle which may be set off by the H.E.A.T. round.

Various forms of such systems have been previously proposed.

One such system is shown in U.S. Pat. No. 3,825,754, Cinzori et al. In the system disclosed by Cinzori et al there are two main channels respectively responsive to radiation (from the source being monitored) in the range of 0.7 to 1.2 microns and in the range of 7 to 30 microns. In the presence of a fire or explosion of the type to be detected, these two channels produce outputs which are fed to a coincidence gate. A third channel has a radiation detector detecting radiation from the source being monitored at 0.9 microns and this channel allows the signals from the two main channels to pass through the coincidence gate only if the energy of the radiation which it detects is less than a predetermined relatively high threshold. The output of the coincidence gate indicates a fire or explosion to be detected. This arrangement is said to discriminate against radiation produced by the explosion or burning of an H.E.A.T. round—which is assumed to produce radiation above the relatively high threshold.

However, such a system, by being dependent for its discriminating action on the level of the energy received in the third channel, is dependent on factors such as the source size and distance.

Another such system is shown in U.S. Pat. No. 4,101,767, Lennington et al. The system disclosed by Lennington et al has a main channel with a radiation detector detecting radiation at 4.4 microns and providing outputs to a logic circuit if the intensity of the radiation which it detects exceeds a predetermined threshold and is rising at at least a predetermined rate. In a subsidiary channel, two radiation detectors, operating at 0.76 and 0.96 microns, produce outputs which are processed to measure the color temperature of the source. If the color temperature exceeds a predetermined relatively high threshold, the logic circuit is prevented from responding to the main channel output. The output of the logic circuit is indicative of a fire or explosion to be detected. This system operates on the basis that an exploding H.E.A.T. round can be discriminated against because its color temperature is very much higher than that of a fire or explosion to be detected.

Such a system is found to be satisfactory but may not discriminate adequately when used in applications where the vehicle armor is non-pyrophoric.

It is an object of the invention to provide an improved fire and explosion detection system. More specific object of the invention is to provide such a system which is better able to discriminate between fires and explosions which are required to be detected and those which are not required to be detected.

SUMMARY OF THE INVENTION

According to the invention, there is provided a fire or explosion detection system for discriminating between radiation produced by a source of fire or explosion to be detected and radiation produced by a source of fire or explosion not to be detected, comprising first and second radiation detecting means respectively responsive to radiation in first and second wavelength bands the second of which is a characteristic wavelength band for a source of fire or explosion to be detected and operative to produce first and second radiation-intensity-dependent electrical signals respectively, output means connected to monitor the first and second signals and operative, unless inhibited by an inhibiting signal, to produce a fire or explosion indicating output only when, for at least a predetermined period of time, the magnitudes of both the first and second signals exceed respective first and second predetermined thresholds and the magnitude of at least said first signal is not falling at more than a predetermined rate, inhibiting means operative to monitor the color temperature of the radiation source viewed by the first and second radiation detecting means to produce an inhibiting signal when the color temperature exceeds a predetermined color temperature threshold, and means connecting the inhibiting signal to inhibit the output means.

According to the invention there is also provided a fire or explosion detection system for discriminating between radiation produced by a source of fire or explosion to be detected and radiation produced by a source of fire or explosion not to be detected, comprising first radiation detecting means responsive to radiation at a wavelength at which radiation is produced by a source not to be detected and operative to produce a first radiation-intensity-dependent electrical signal, second radiation detecting means responsive to radiation at a wavelength characteristic of a fire or explosion source to be detected and operative to produce a second radiation-intensity-dependent electrical signal, first threshold means connected to receive the first radiation-intensity-dependent signal and operative to produce a first threshold signal when the magnitude of the first radiation-intensity-dependent signal exceeds a first predetermined threshold, second threshold means connected to receive the second radiation-intensity-dependent signal and operative to produce a second threshold signal when the magnitude of the second radiation-intensity-dependent signal exceeds a second threshold value, first rate of change means connected to receive the first-radiation-intensity-dependent signal and operative to produce a first rate of change signal when the first radiation-intensity-dependent signal is not falling at more than a predetermined rate of fall, second rate of change means connected to receive the second radiation-intensity-dependent signal and operative to produce a second rate of change signal when the second radiation-intensity-dependent signal is rising at at least a predetermined rate of rise, color temperature means responsive to the color temperature of the source of fire or explosion and operative when a predetermined color temperature threshold is exceeded to produce a color temperature signal lasting thereafter during the continuance of the color temperature above the predetermined color temperature threshold but for not more than a predetermined relatively long period of time, logic means connected to receive the first and second threshold signals, the first and second rate of change signals and the color temperature signal so as to produce a predetermined logic output only when the first and second threshold signals and the first and second rate of change signals simultaneously exist and the color temperature signal is absent, and time delay means responsive to the predetermined logic output and operative to produce a fire or explosion indicating output only when the said predetermined logic output is maintained for at least a predetermined relatively shorter period of time.

According to the invention, there is further provided a fire or explosion detection system for discriminating between radiation produced by a source of fire or explosion to be detected and radiation produced by a source of fire or explosion not to be detected, comprising first and second radiation detecting means respectively responsive to radiation at first and second wavelengths, the first of which is a wavelength produced by a source not to be detected, to produce first and second radiation-intensity-dependent electrical signals respectively, output means connected to monitor the first and second radiation-intensity-dependent electrical signals and operative, unless inhibited by an inhibiting signal, to produce a fire or explosion indicating output only when, for at least a predetermined period of time, the magnitudes of both the first and second radiation-intensity-dependent electrical signals exceed respective first and second predetermined thresholds and the magnitude of at least the first radiation-intensity-dependent signal is not falling at more than a predetermined rate, means connected to receive the first radiation-intensity-dependent electrical signal and to produce a medium threshold signal if the magnitude of the first radiation-intensity-dependent signal exceeds a predetermined threshold higher than the said first threshold, inhibiting means responsive to initial production of the said medium threshold signal to produce an inhibiting signal for a predetermined duration, and means connecting the inhibiting signal to inhibit the output means for the said duration.

DESCRIPTION OF THE DRAWINGS

A fire and explosion detection systems embodying the invention will now be described, by way of example only, with reference to the accompanying diagrammatic drawings in which.

DESCRIPTION OF PREFERRED EMBODIMENTS

Figure 1:
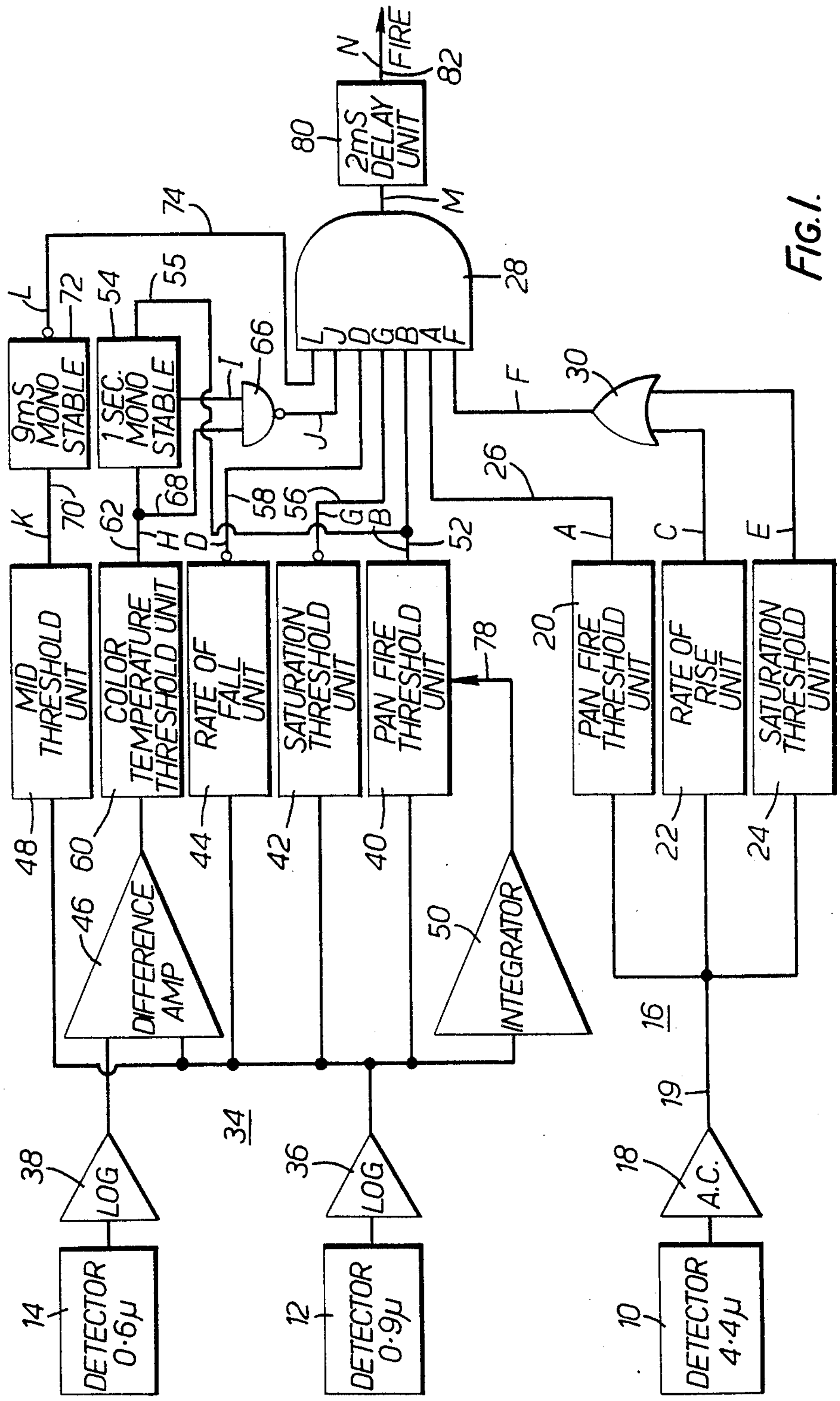
FIG. 1 is a block diagram of one of the systems.

As shown in FIG. 1, the system has three radiation detectors 10,12 and 14 which are respectively arranged to be responsive to radiation in narrow wavelength bands centered at 4.4, 0.9 and 0.6 microns. For example, the detectors may be made to be responsive to radiation in the respective wavelength bands by mounting appropriate radiation filters immediately in front of them. Detector 10 may be a thermopile sensor and detectors 12 and 14 may be photocell type detectors such as silicon diode or lead selenide sensors. All three detectors could be photoelectric type detectors such as silicon diode or lead selenide sensors.

However, in the following description it will be assumed that detector 10 is a thermopile sensor and detectors 12 and 14 are silicon diode sensors.

The wavelengths of 0.6 and 0.9 microns are wavelengths at which an exploding round produces substantial radiation and the wavelength of 4.4 microns corresponds to a peak radiation emission of a hydrocarbon fire. However, each of these events produces radiation at all three wavelengths.

Detector 10 is connected to feed its electrical output to a channel 16. This has an input amplifier 18 feeding units 20, 22 and 24 in parallel. In unit 20, the level of the output signal of amplifier 18, representing the intensity of the radiation received by the detector 10, is compared with a threshold level representing a so-called "pan fire" of predetermined size and at a predetermined distance, this being the minimum fire which the system is required to be able to detect. If the signal on line 19 exceeds the pan fire threshold applied by unit 20, the unit produces a binary "1" output on a line 26 which is fed to an AND gate 28.

Unit 22 is a rate of rise responsive unit. If the signal on line 19 is rising at at least a predetermined rate of rise threshold, unit 22 produces a binary "1" output which is fed to AND gate 28 through an OR gate 30.

Unit 24 is a saturation detection unit. If the signal on line 19 reaches a level indicating saturation of amplifier 18, unit 24 produces a binary "1" output which is fed to AND gate 28 through the OR gate 30.

Detectors 12 and 14 feed a channel 34 the detectors feeding the channel through respective amplifiers 36, 38, each amplifier having a logarithmic characteristic. The output of amplifier 36 is fed to six units 40,42,44,46,48 and 50 in channel 34.

Unit 40 is a pan fire threshold unit similar to unit 20 in channel 16. If the intensity of radiation received from amplifier 36 exceeds a fixed threshold representing a pan fire of predetermined size and at a predetermined distance, it produces a binary "1" output which is fed on a line 52 to AND gate 28 and also to a control input of a monostable 54 on a line 55.

Unit 42 is a saturation detection unit similar to unit 24. In other words, it determines whether or not the input received from amplifier 36 corresponds to saturation of the amplifier. However, it produces an inverted output as compared with unit 24: in other words, it normally produces a binary "1" output on a line 56 which is fed to AND gate 28. However, if it detects that the input received corresponds to saturation of amplifier 36, the output changes to binary "0".

Unit 44 is a rate of fall sensing unit. If it determines that the input received from amplifier 36 is falling at more than a predetermined rate of fall, it produces a binary "0" output on a line 58 to the AND gate 28. When the rate of fall is less than the predetermined rate of fall, the output on line 58 changes to binary "1".

Unit 46 is a difference measuring unit which is connected also to receive the output of amplifier 38. Unit 46 therefore measures the difference between two signals which are respectively logarithmically dependent on the intensities of radiation received by detectors 12 and 14. The output of unit 46 is therefore proportional to the logarithm of the ratio of the outputs of the two detectors. The wavelengths of detectors 12 and 14 are such that the ratio of the outputs of the two detectors is dependent on the color temperature of the source being viewed by the two detectors. The output of unit 46 is therefore a measure of this color temperature. This output is fed to a color temperature threshold unit 60 which compares the received signal with a relatively high color temperature threshold (e.g. 2,500 K). If the measured color temperature exceeds this color temperature threshold, a binary "1" output is produced on a line 62 which triggers monostable 54 to produce a binary "1" output on a line 64 having a period of one second. Line 64 is fed to a NAND gate 66 together with the direct output on line 62 via a line 68.

Unit 48 is a mid-threshold detecting unit. It operates similarly to unit 40 except at a higher threshold which is between the panfire threshold of unit 40 and the saturation threshold of unit 42. If the input from amplifier 36 has a level exceeding this mid-threshold, unit 48 produces a binary "1" output on a line 70.

This triggers a monostable 72 which produces a binary "0" output having a period of nine milliseconds on a line 74 connected to AND gate 28; until monostable 72 is triggered, line 74 carries a binary "1".

Unit 50 is an integrator which integrates the output of amplifier 36 with a 200 millisecond decay time constant. The integrator 50 is connected to a control input of the threshold unit 40 and increases the panfire threshold from its basic level by an amount dependent on the changing value of the integrated output of the integrator up to a fixed maximum value.

As will be explained in more detail below, therefore, the threshold applied by threshold unit 40 has a level (the basic panfire threshold) which is varied by integrator 50 in dependence upon the previous exposure to radiation of the 0.9 micron detector.

The output of AND gate 28 is fed to a timing unit 80. Unit 80 produces an output on a line 82 if (but only if) it receives a continuous binary "1" output from AND gate 28 for a period of at least 2 milliseconds.

As will now be explained, the system operates so that the output signal on line 82 is a signal indicating that the source of radiation being viewed by the three detectors is a source to which the system is to respond; that is, in this example it is a hydrocarbon fire. If the source of radiation is an exploding H.E.A.T. round, no output is produced on line 82.

The operation will now be described with reference to the waveform diagrams of FIGS. 2A and 2B, 3A and 3B, 4A and 4B, 5A and 5B, and 6A and 6B. The waveform diagrams illustrate the operation of the circuit of FIG. 1 under different operating conditions which will be described in detail below:

Case I

Figure 2A:
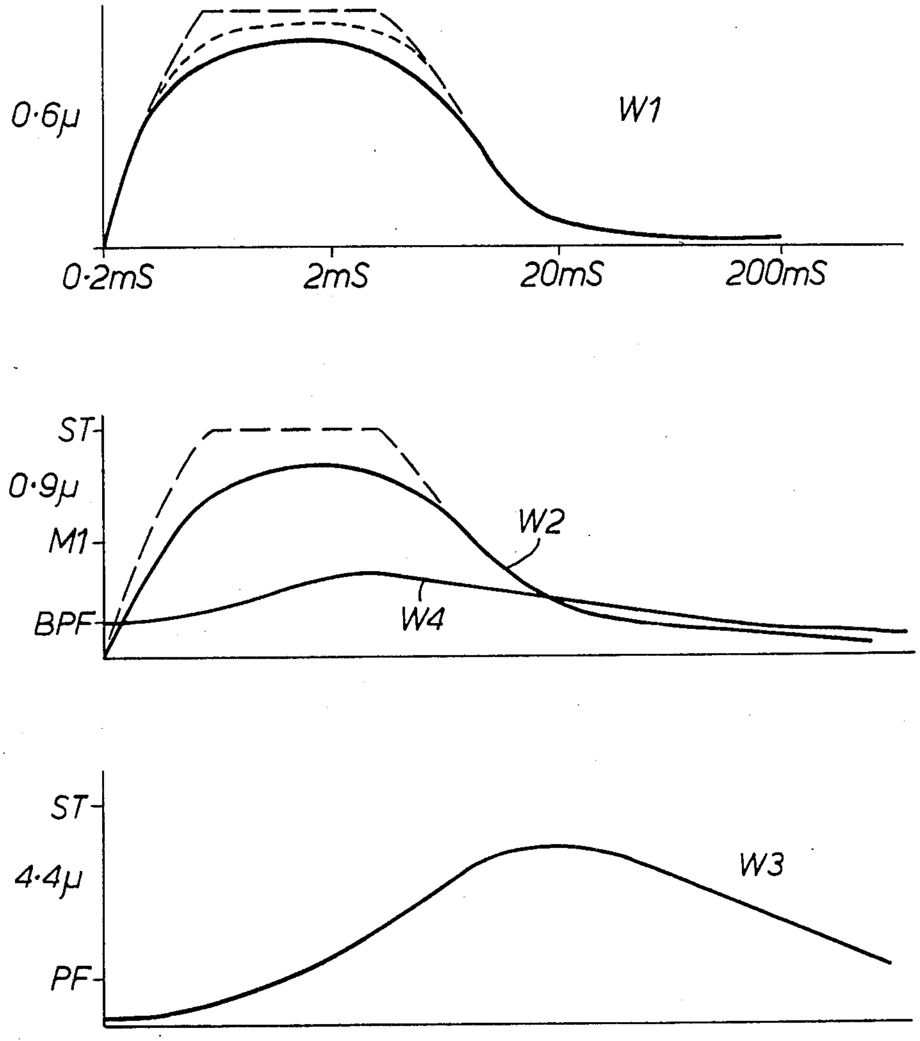
FIGS. 2A, 3A, 4A, 5A and 6A show waveforms of radiation intensity as measured at different wavelengths in the system under different external conditions.
Figure 2B:
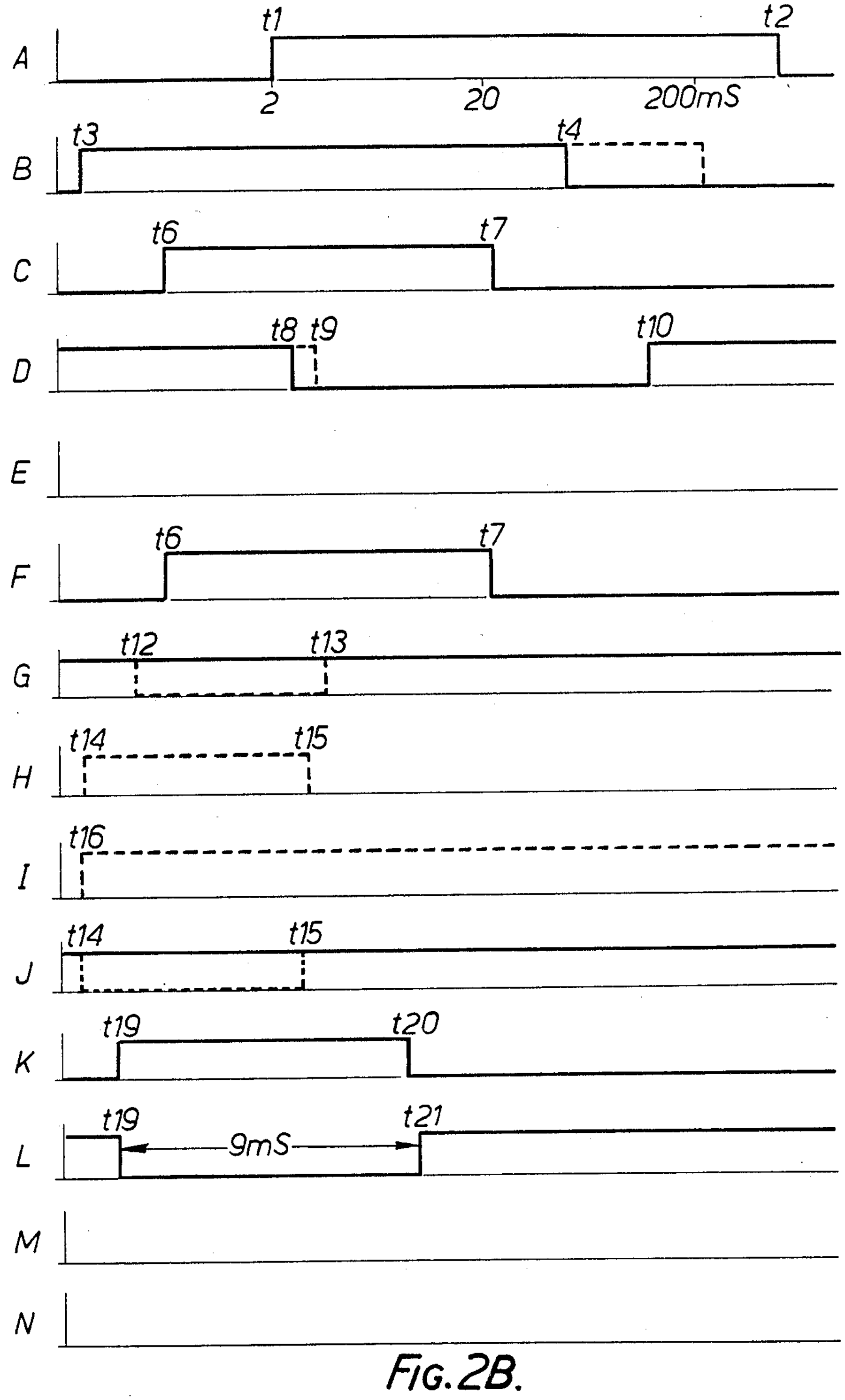
FIGS. 2B, 3B, 4B, 5B and 6B show logic signals occurring in the system under the different external conditions.

This is the situation in which an exploding H.E.A.T. round pierces the armor of a vehicle and enters the vehicle and passes into the field of view of the detectors but without causing a hydrocarbon fire (that is, it does not strike the vehicle's fuel tank, fuel lines or hydraulic system). It is assumed in this case that the armor is inert, that is, it does not itself burn. This situation is illustrated in the diagrams of FIGS. 2A and 2B.

Case II

This corresponds to Case I in that it represents the situation in which an exploding H.E.A.T. round pierces the armor of the vehicle without causing a hydrocarbon fire. However, in this case, the armor is assumed to be of a type which "burns" in response to the round, that is, there is a pyrophoric reaction of the armor producing additional radiation which is viewed by the detectors. This situation is also illustrated in FIGS. 2A and 2B.

Case III

Figure 3A:
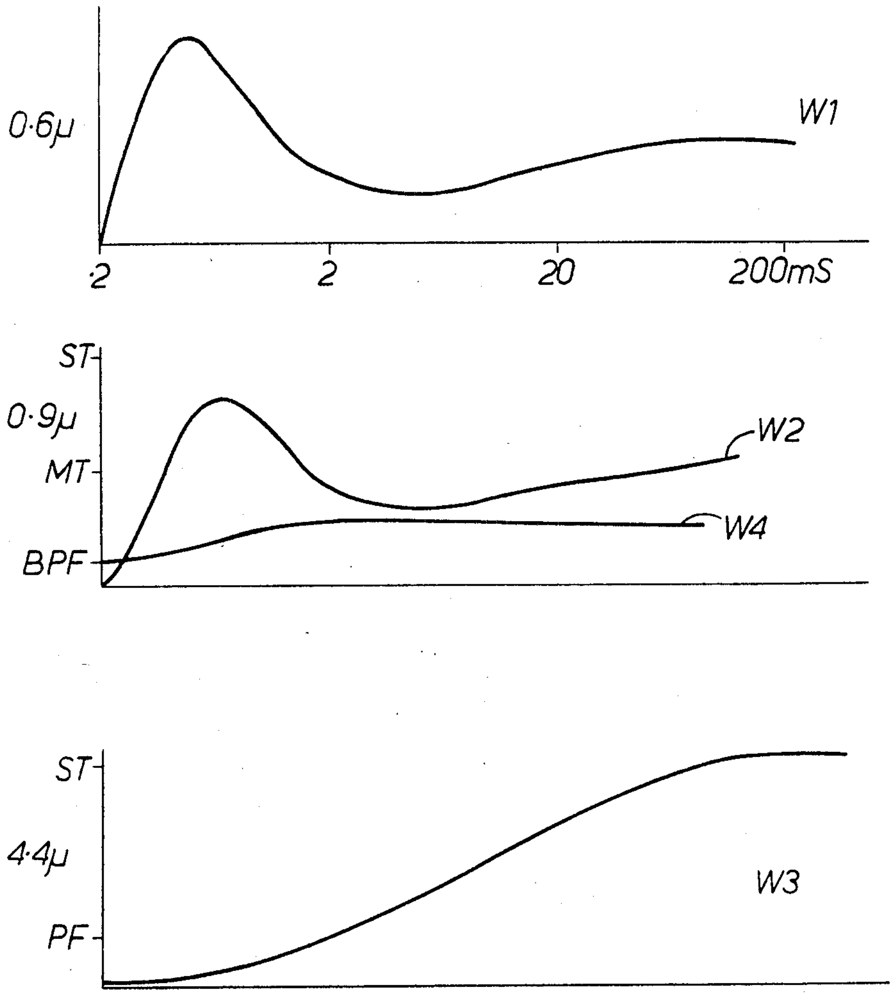
Figure 3B:
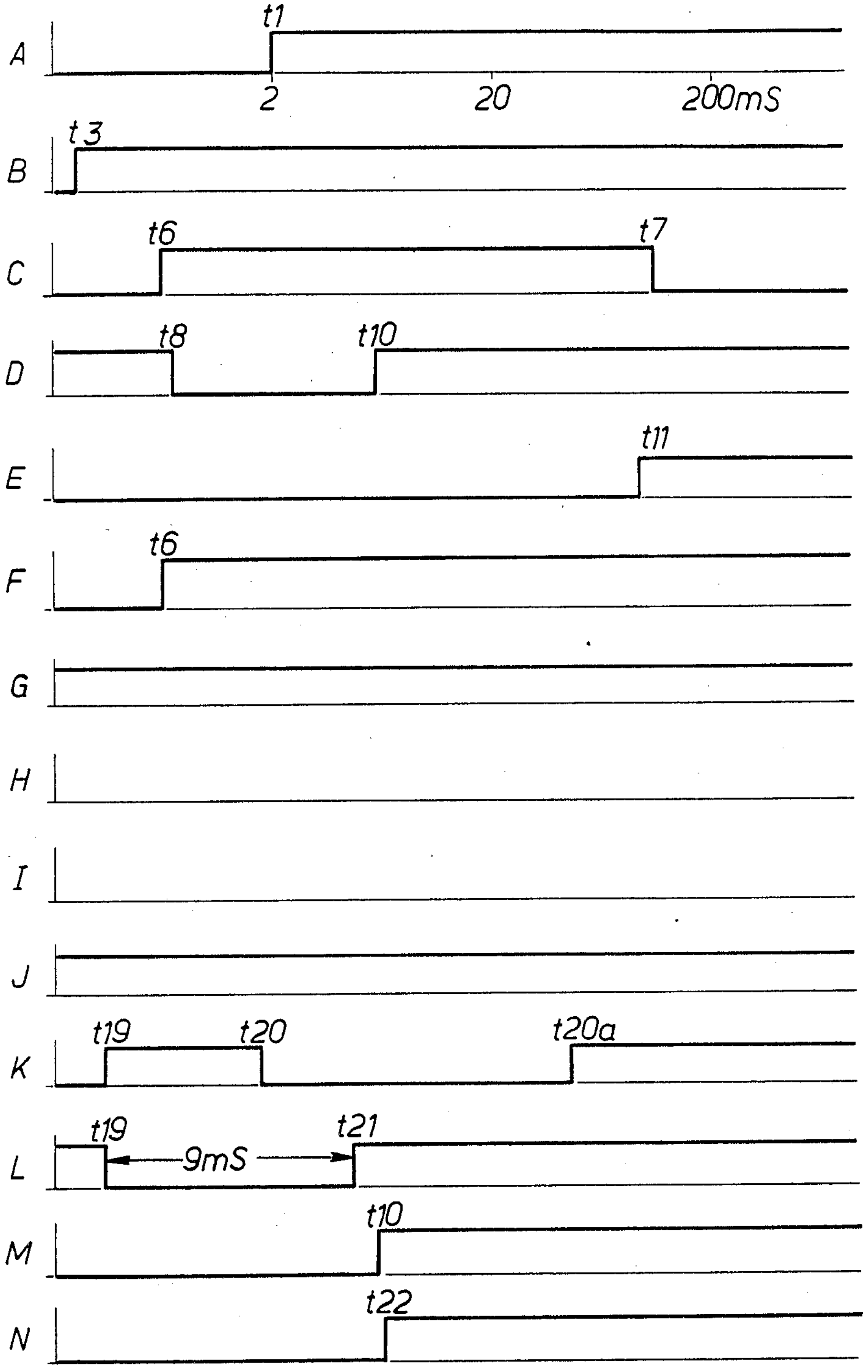

This is a situation where an exploding H.E.A.T. round pierces the armor of the vehicle, passes through the vehicle's fuel before entering the protected area of the vehicle and causes a hydrocarbon fire. This situation is illustrated in FIGS. 3A and 3B.

Case IV

Figure 4A:
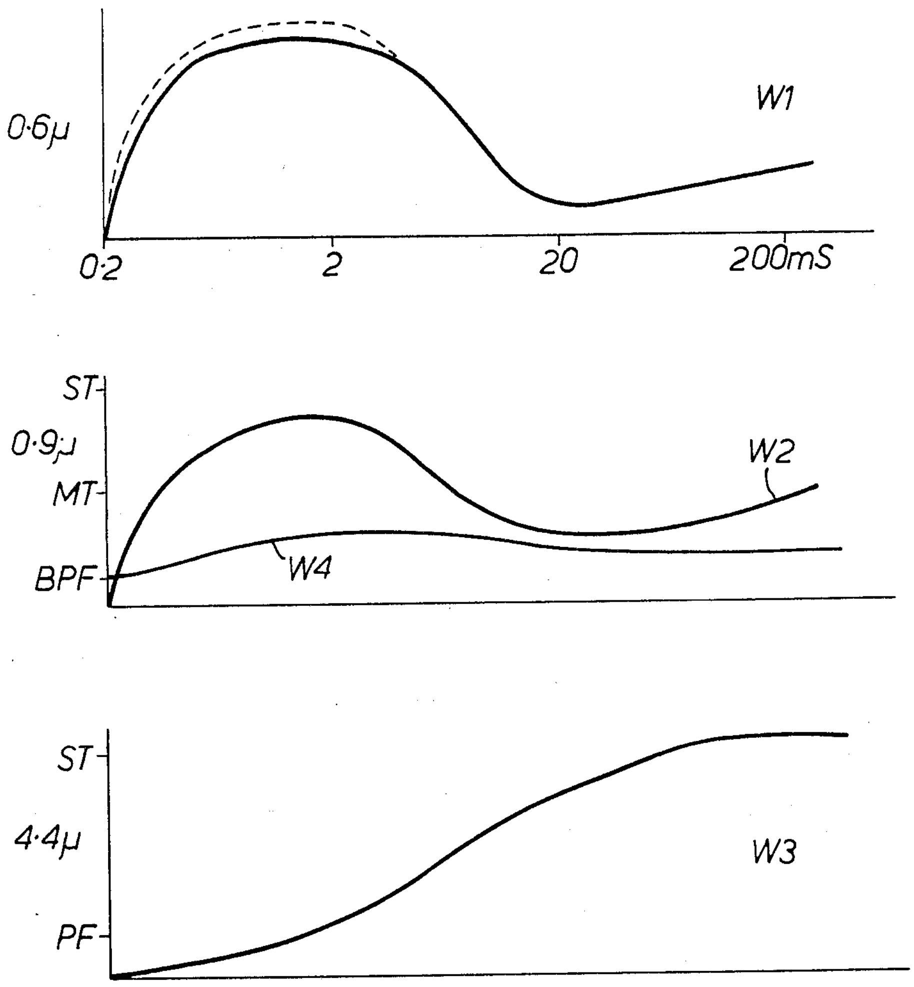
Figure 4B:
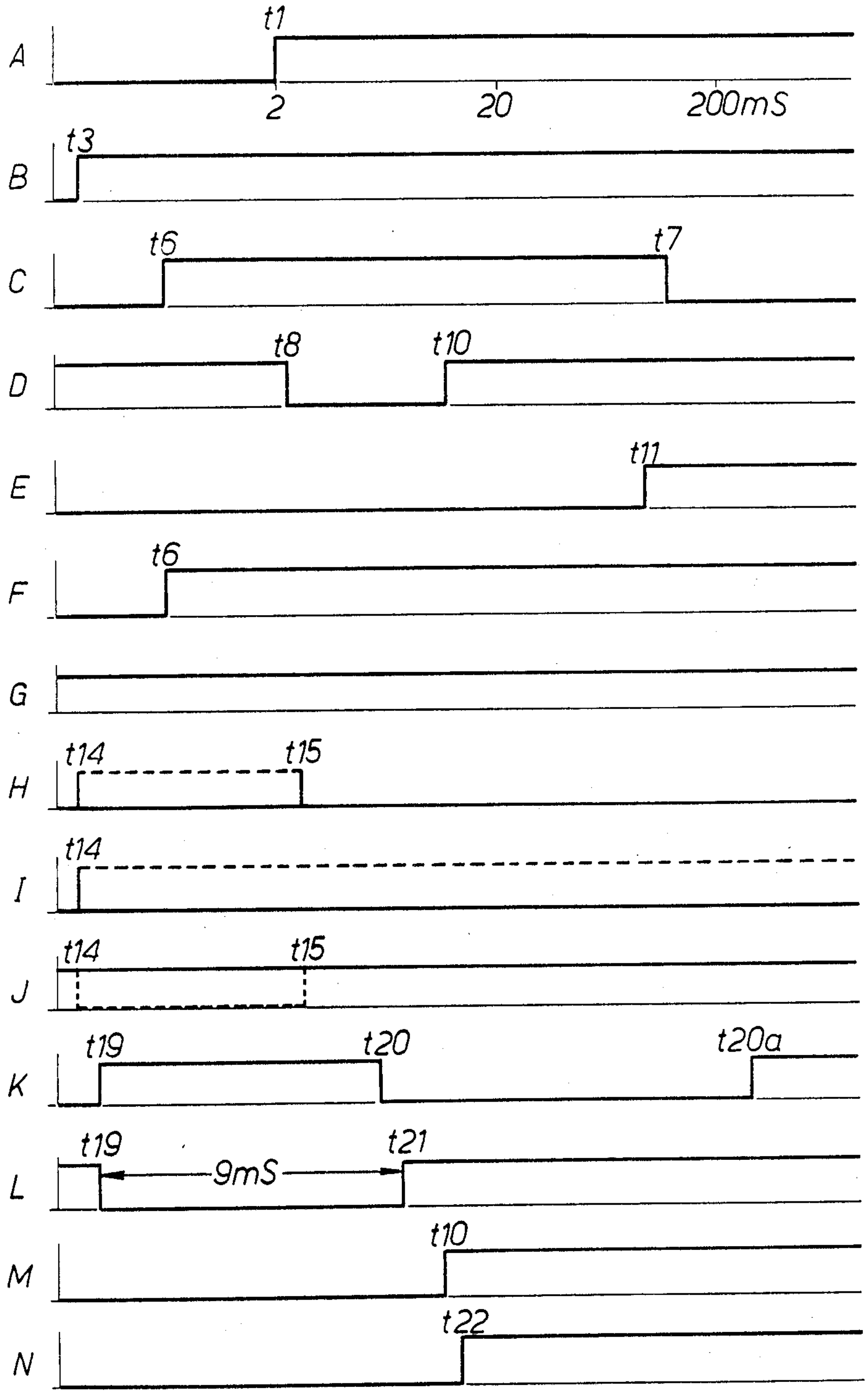

This represents the situation where an exploding H.E.A.T. round pierces the armor of the vehicle, which is assumed to be of the inert type, passes across the protected area of the vehicle and then pierces the vehicle's fuel system and causes a hydrocarbon fire. This situation is illustrated in FIGS. 4A and 4B.

Case IVA

This is the same as Case IV, except that the armor is assumed to be of a type which produces a pyrophoric reaction. This situation is also illustrated in FIGS. 4A and 4B.

Case V

Figure 5A:
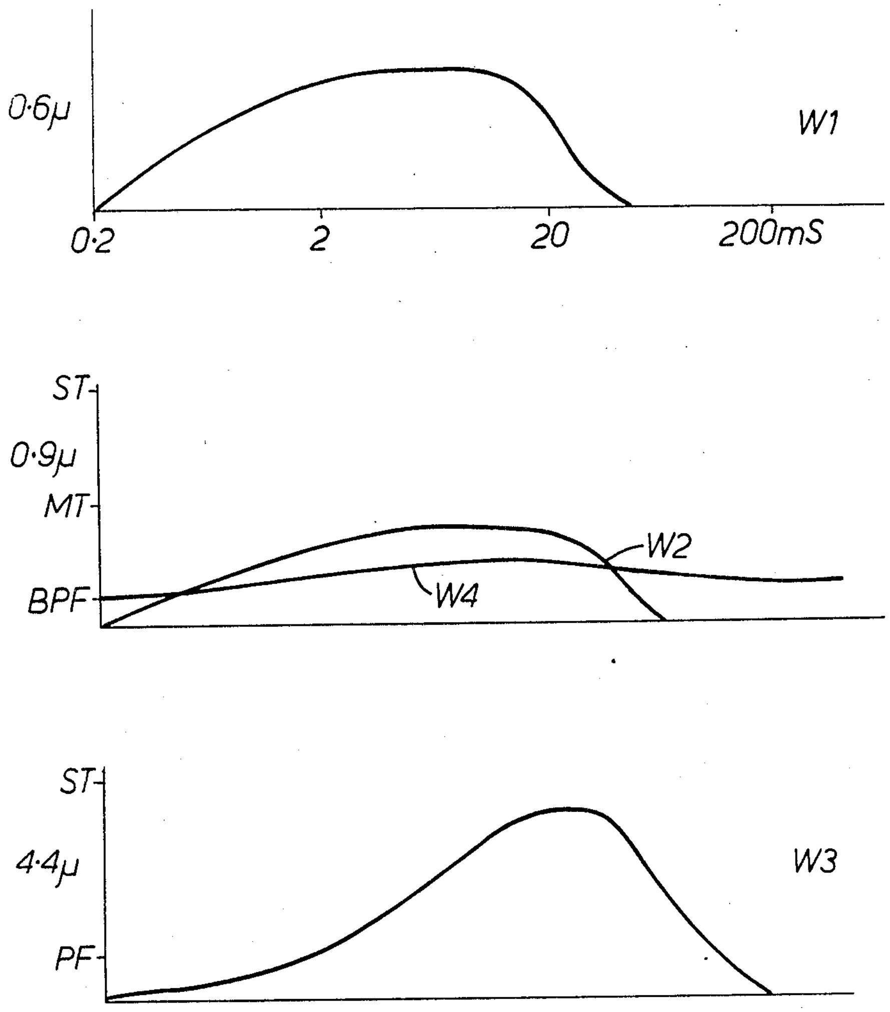
Figure 5B:
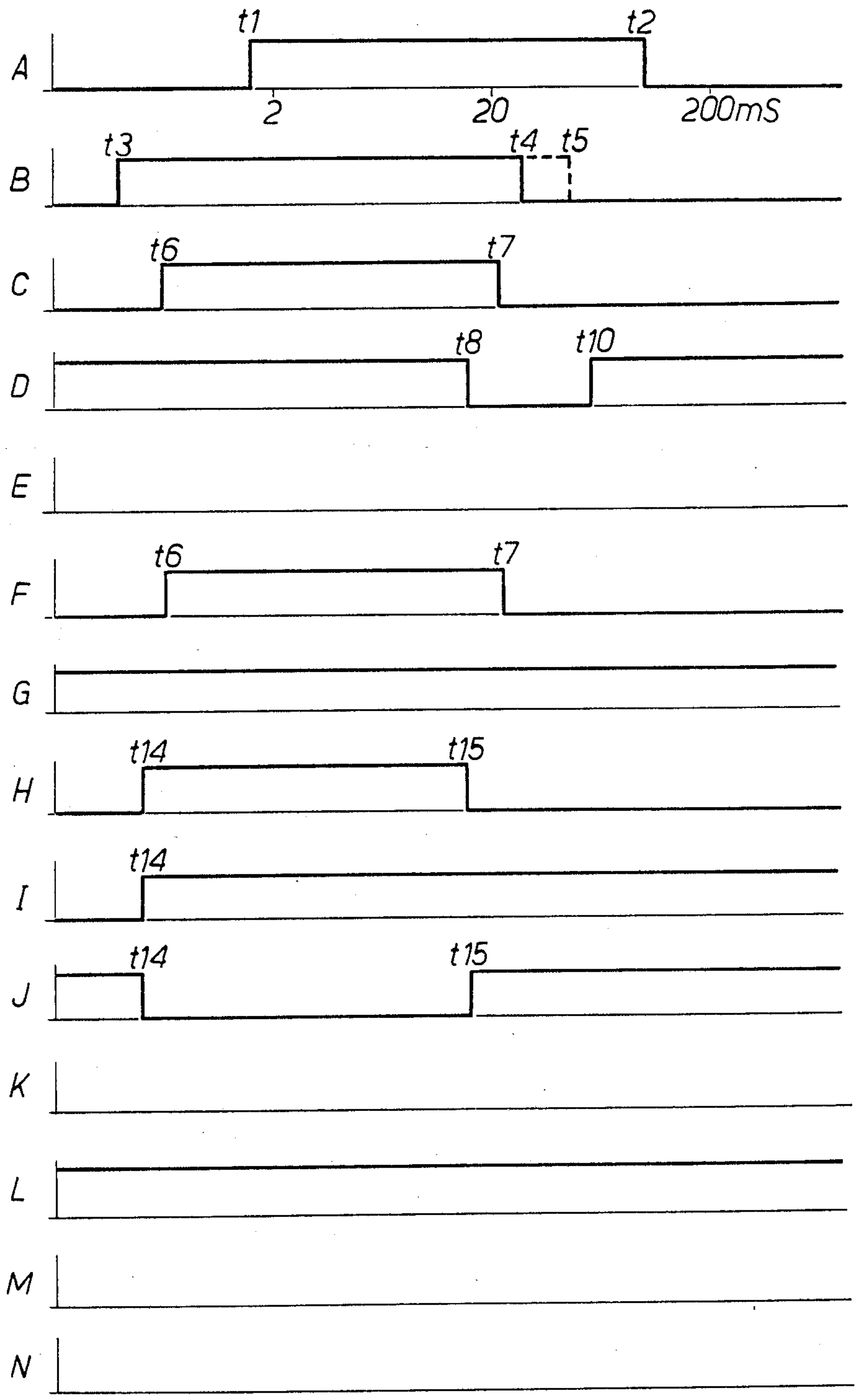

This is the situation where no H.E.A.T. round pierces the vehicle but the vehicle's gun produces a muzzle flash within the field of view of the detectors. This situation is illustrated in FIGS. 5A and 5B.

Case VI

Figure 6A:
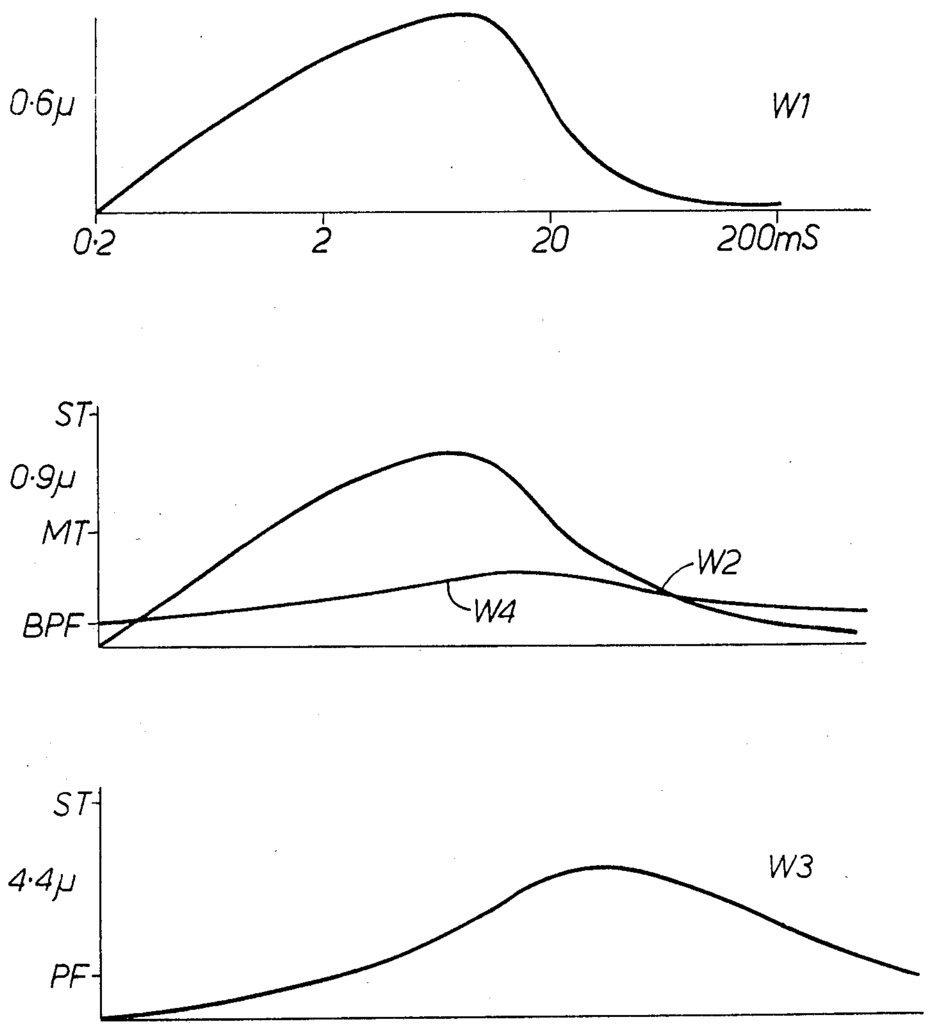
Figure 6B:
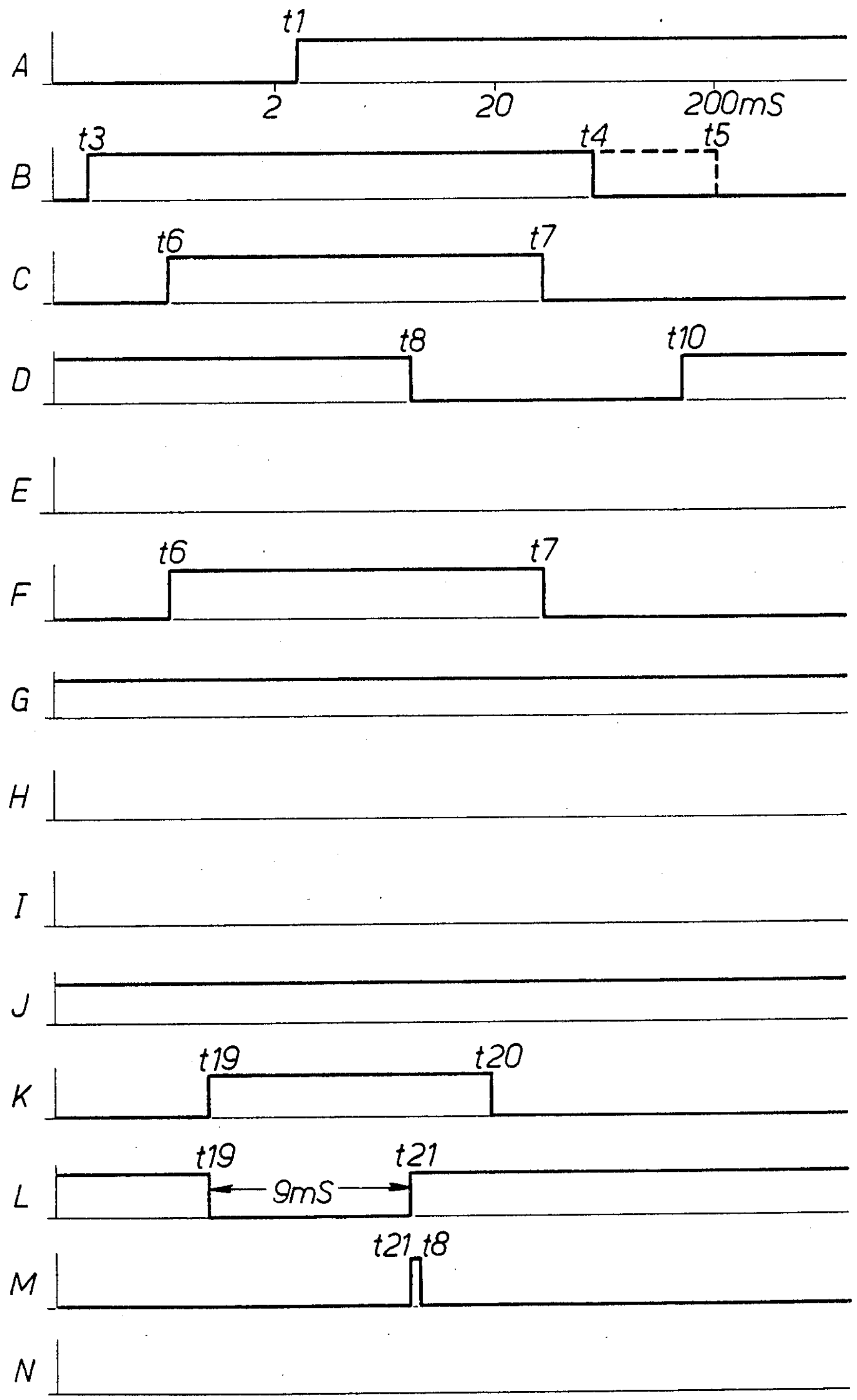

This represents the situation where an exploding H.E.A.T. round pierces the armor of the vehicle (but not its fuel tank) and passes along a path which is out of the direct field of view of the detectors but nevertheless produces radiation some of which reaches the detectors. This situation is shown in FIGS. 6A and 6B.

Case VII

This is the situation where the detectors are viewing a standard pan fire, that is, a hydrocarbon fire of at least a predetermined size and within a predetermined distance.

Case VIII

This corresponds to Case VII, but the pan fire is now assumed to be viewed in direct sunlight.

Case IX

This corresponds to Case I but the exploding H.E-.A.T. round is assumed to pass very close to the detectors. This situation is illustrated in FIGS. 2A and 2B.

In the following description, the definitions of the various Cases given above will be referred to.

Each of FIGS. 2A, 3A, 4A, 5A and 6A shows four waveforms: W1,W2,W3, and W4.

Each waveform W1 shows the output of the 0.6 micron detector 14 plotted on a log-log scale, the vertical axis representing intensity and the horizontal axis representing time.

Each waveform W2 plots the output of the 0.9 micron detector 12 again on a log-log basis, the axes corresponding to those of waveform W1. On each vertical axis for waveform W2 are shown the basic pan fire threshold ("BPF") applied by threshold unit 40 (FIG. 1), the mid-threshold ("MT") applied by the mid-threshold unit 48, and the saturation threshold ("ST") applied by saturation threshold unit 42.

Each waveform W3 plots the output of the 4.4. micron detector 10 against time, the vertical axis representing intensity (to an arithmetic scale) and the horizontal axis representing time (log scale). Shown on the vertical axis of the waveforms W2 are the pan fire threshold ("PF") applied by the pan fire threshold unit 20 and the saturation threshold ("ST") applied by the saturation threshold unit 24.

Each waveform W4 plots the varying panfire threshold ("VPF") of the threshold unit 40 against time, the vertical axis representing the value of the threshold and the horizontal axis representing time to a log scale. As has already been explained, the varying threshold of the threshold unit 40 is a function of the integrator output of the 0.9 micron detector 12.

All four waveforms on each of FIGS. 2A, 3A, 4A, 5A and 6A have a common, logarithmic, time scale.

FIGS. 2B, 3B, 4B, 5B and 6B are logic diagrams. Each one shows fourteen logic waveforms labelled "A" to "N" and these show the logical state, plotted against time on the horizontal scale (a logarithmic scale) of the points labelled "A" to "N" in FIG. 1.

The operation will now be considered in detail.

Case I

FIG. 2A in fact shows three waveforms W1 and two waveforms W2. It is the full-line waveforms W1 and W2 which apply for Case I.

This is the Case where there is no hydrocarbon fire. Because the exploding H.E.A.T. round passes freely through the vehicle, there will be a substantial amount of radiation at 0.6 and 0.9 microns, rather more at 0.6 microns in fact reflecting the relatively high color temperature of the event. The output of neither of these detectors reaches the saturation threshold.

The exploding H.E.A.T. round creates a significant amount of radiation at 4.4. microns as shown by waveform W3, which also shows the relatively slow reaction of this detector.

In FIG. 2B, only the full-line waveforms are applicable to the Case I situation.

As shown in waveforms W3, (FIG. 2A), and A (FIG. 2B), the output of the 4.4. micron detector 10 goes above the pan fire threshold of threshold unit 20 at about 2 milliseconds (time t1) and drives logic signal A to "1" where it remains until above 200 milliseconds (time t2).

The output of the 0.9 micron detector 12 goes above the threshold of the threshold unit 40 at time t3, almost immediately after time zero (that is, the time when the event being monitored starts), because of the very rapid rise of the output of this detector. Waveform W4 in FIG. 2A shows the varying pan fire threshold, "VPF", applied by the threshold unit 40 because of the operation of the integrator 50, and the effect of this is to cause logic signal B to return to "0" at time t4. The dotted extension in logic waveform B in FIG. 2B shows how the return of logic signal B to "0" would be delayed until time t5 in the absence of the integrator 50, that is, if the threshold unit 40 was always applying the basic pan fire threshold.

At time t6, the rate of rise of the 4.4 micron detector 10 exceeds the threshold applied by the rate of rise unit 22 and logic signal C gose to "1" and then returns to "0" at time t7, just after 20 milliseconds. Logic signal D is "1" when the rate of fall of the output of the 0.9 micron detector is not more than a predetermined amount. Therefore, logic signal D will be held at "1" because the output of the 0.9 micron detector is not falling.

At time t8, a little after 2 milliseconds, the rate of fall now exceeds the predetermined amount and signal D goes to "0". However, waveform W2 in FIG. 2A shows that the output of 0.9 micron detector begins to level off as the radiation from the exploding round decays and at time t10, the rate of fall, once more becomes less than the predetermined amount and signal D goes to "1".

The output of the 4.4 micron detector never exceeds the saturation threshold applied by the threshold unit 24, and logic signal E therefore remains at "0".

Therefore, the logic output F of the OR gate 30 simply follows logic signal C.

The output of the 0.9 micron detector 12 never exceeds the saturation threshold applied by threshold unit 42, and logic signal G therefore remains at "1" continuously.

The color temperature of the exploding H.E.A.T. round in this Case does not exceed the predetermined threshold applied by the color temperature threshold unit 60, and logic signal H therefore remains at "0" continuously.

Therefore the monostable 54 is not triggered and logic signal I remains at "0".

The logic signal J, being the output of the NAND gate 66, therefore remains at "1" continuously.

The output of the 0.9 micron detector 12 exceeds the mid-threshold applied by the threshold unit 48 at time t19 and signal K therefore goes to "1" at this time. It remains above this threshold until time t20.

When signal K goes to "1" at time t19, it triggers monostable 72 which therefore switches signal L from "1" to "0" at this time and it is held at "0" for a fixed period of 9 milliseconds, thereafter reverting to "1" at time t21.

The AND gate 20 can only switch logic signal M to "1" when logic signals A, B, D, F, G, L, and J are simultaneously at "1". Reference to these logic waveforms in FIG. 2B shows that this does not occur and signal M therefore remains continuously at "0". Signal N must therefore likewise remain continuously at "0" and no "FIRE" signal is given on line 82.

Study of the waveforms of FIG. 2B will show that, in the absence of the mid-threshold unit 48 and the monostable 72, AND gate 28 could switch to "1" for a short interval of time between t1 and t8, that is, for the short interval of time in which, simultaneously, the output of the 4.4. micron detector 10 exceeds the pan fire threshold of threshold unit 20 and the rate of fall of the output of the 0.9 micron detector 12 is not more than the predetermined amount. However, even in this case a FIRE signal would not be produced on line 82 because the time between t1 and t8 is less than 2 milliseconds and this would prevent logic signal M from switching logic signal N to "1". In other words, it would be the relatively early rate of fall of the output of the 0.9 micron detector which would prevent the production of a FIRE signal. The threshold unit 48 and the monostable 72 are not necessary for preventing the FIRE signal in this Case. Their purpose will be explained later.

As is apparent from FIG. 2B, the logic signal D will revert to "1" at time t10, owing to the levelling out and slow decay of the output of the 0.9 micron detector 12, see waveform W2 in FIG. 2A. The effect of the integrator 50 in varying the pan fire threshold of the threshold unit 40 prevents this reversion of signal D to "1" at time t10 causing production of a FIRE signal 2 milliseconds later in the event that the slow response of the 4.4 micron detector results in the persistence of signal C, and thus signal F, beyond time t10.

Case II

In this Case, the color temperature of the event being viewed by the detectors is significantly higher because of the pyrophoric reaction of the armor. This is shown in FIG. 2A, waveform W1, by the dotted curve which indicates the significantly higher radiation at 0.6 microns. The relative amount of radiation at 0.9 microns is not significantly altered.

The dotted waveforms H, I and J in FIG. 2B show the effect of the higher color temperature. Logic signal H now goes to "1" at time t14 and remains there until time t15, when the color temperature has once more fallen below the threshold applied by the threshold unit 60. As soon as signal H goes to "1", monostable 54 is triggered and signal I goes to "1" and remains there for 1 second. Signal J therefore falls to "0" at time t14, reverting to "1" at time t15, and thus differs from Case I where it remained continuously at "1".

It will be apparent that the fall of signal J to "0" between times t14 and t15 provides additional protection against the incorrect production of a FIRE signal—though such a signal is in any case prevented by the considerations discussed in Case I.

Case IX

Because this Case is illustrated in FIGS. 2A and 2B, it will be considered at this time.

Case IX is the Case where an exploding H.E.A.T. round does not pass through the vehicles fuel tank but passes very close to the detectors. The effect is shown by the chain-dotted curves of waveforms W1 and W2 in FIG. 2A, illustrating how the very close round produces sufficient energy to make the output of the 0.9 micron detector exceed the saturation threshold of threshold unit 42. Therefore, as shown in FIG. 2B, logic signal G goes to "0" at time t12 and stays at this level until time t13 when the output of the 0.9 micron detector once more comes below the saturation threshold. The only other change to FIG. 2B (as compared with the Case I situation) is that logic signal D does not fall to "0" at time t8 but remains at "1" until time t9, because the falling away of the output of the 0.9 micron detector is delayed slightly.

The fall of logic signal G to "0" between times t12 and t13 provides additional protection against the production of a FIRE signal. Between these times, signal M, and thus signal N, cannot go to "1". Of course, overall protection against the production of a FIRE signal continues to be provided by signal L.

As was explained above with reference to Case I, however, in the Case I situation it would be possible to dispense with the threshold unit 48 and the monostable 72—because production of a FIRE signal would effectively be prevented by the 2 millisecond delay unit 80; this would have prevented a FIRE signal from being produced by the switching of signal M to "1" between times t1 and t8. However, in the Case IX situation, the relevant time difference is not from time t1 to time t8 but from time t1 to t9. This is more than 2 milliseconds. Therefore, delay unit 80 could not prevent a FIRE signal. However, even in the absence of the threshold unit 48 and the monostable 72, no FIRE signal could be produced—because the threshold unit 42 switches signal G to "0" for a sufficient period.

Case III

Here, the exploding H.E.A.T round has passed through the vehicle's fuel tank before entering the protected area and causes a hydrocarbon fire. The effect of the fuel, as well as of the actual fire itself, on the exploding round is partially to "quench" the explosion of the actual round. The result is, therefore, that the radiation at 0.6 microns and at 0.9 microns falls off more rapidly, as shown in waveforms W1 and W2 in FIG. 3A, as compared with the Case I situation. However, the outputs at these two wavelengths do not decay to zero because the hydrocarbon fire, becoming significant at approximately 10 milliseconds, causes the radiation at these wavelengths to start to increase again.

The radiation at 4.4 microns will increase relatively steadily from zero, initially because of the radiation from the exploding round but then because of the radiation from the hydrocarbon fire (which, as explained, has a peak at this particular wavelength).

The varying pan fire threshold of the threshold unit 40 increases substantially in line with that shown for the Case I situation in waveform W4 but then tends to stay relatively high because the output of the radiation at 0.9 microns does not undergo a steady decay but starts to rise again when the actual fire starts.

At time t1 (FIG. 3B), the output at 4.4 microns exceeds the pan fire threshold and signal A goes to "1" and remains at this level.

At time t3, the output of 0.9 microns exceeds the basic pan fire threshold applied by threshold unit 40 and signal B goes to "1". The output at this wavelength continues to exceed both the fixed and the moving pan fire thresholds and signal B therefore remains at "1".

At time t6, the output at 4.4 microns exceeds the rate of rise threshold applied by threshold unit 22 and signal C goes to "1". It remains at this level for a substantial time, in fact for nearly 200 milliseconds by which time it is assumed that the level of the hydrocarbon fire has begun to stabilise. The initial rate of rise of the output of the 0.9 micron detector 12 is sufficient to hold signal D to "1". At time t8, the rate of rise of the signal from this detector has fallen sufficiently for signal D to switch to "0" where it remains until time t10. At this time, the output at 0.9 microns has levelled off preparatory to rising again, because of the commencing hydrocarbon fire.

At time t11, the hydrocarbon fire causes the output at 4.4 microns to exceed the saturation threshold of threshold unit 24 and signal E goes to "1". This is just before signal C switches back to "0" at time t7. Signal F therefore goes to "1" at time t6 and remains at this level.

The output of the 0.9 micron detector does not exceed the saturation threshold, and signal G therefore remains at "1".

The color temperature threshold is not exceeded and signal H therefore remains at "0" as, therefore, does signal I. Signal J therefore is held at "1".

Between times t19 and t20, the output at 0.9 microns exceeds the mid threshold applied by threshold unit 48 and signal K therefore goes to "1" between these times. Therefore, signal L is switched to "0" at the time t19 and is held at this level for the fixed period of 9 milliseconds, reverting to "1" at time t21.

In fact, signal K will switch back to "1" at time t20*a* because the output of the 0.9 micron detector starts to increase again owing to the hydrocarbon fire. However, monostable 72 is not switched a second time because it is arranged to be incapable of being switched more than once within a fixed relatively long period such as at least 200 milliseconds.

Analysis of the logic waveforms of FIG. 3B shows that the AND gate 28 switches signal M to "1" at time t10—after the end of the 9 millisecond duration for which signal L is at "0" and coincident with the reversion of signal D to "1" as the hydrocarbon fire builds up and increases the radiation at 0.9 microns.

2 milliseconds later, at time t22, signal N goes to "1" producing the required FIRE signal.

Case IV

In this situation, the exploding H.E.A.T. round enters the vehicle, and for the initial part of its travel through the vehicle, the effect on the radiation detectors is the same as for the Case I situation; and waveforms W1, W2 and W3 are therefore initially very similar to those shown in FIG. 2A. However, the round is then assumed to enter the fuel tank and a hydrocarbon fire then starts. This has the effect of causing the radiation at 0.6 and 0.9 microns to begin to rise again. The radiation at 4.4 microns, initially arising from the exploding H.E.A.T. round itself, begins to level off as the round is quenched on entering the fuel tank but then resumes its previous rise—because of the radiation from the hydrocarbon fire itself.

In FIGS. 4A and 4B, only the full line curves apply to Case IV.

At time t1 (FIG. 4B), the output of the 4.4 micron detector exceeds the pan fire threshold and signal A goes to "1".

At time t3, very soon after time zero, the output of the 0.9 micron detector exceeds the fixed pan fire threshold and signal B goes to "1". As shown in waveform W2, it remains above this threshold and also above the moving pan fire threshold thereafter.

At time t6, the rate of rise of the output of the 4.4 micron detector exceeds the threshold and signal C goes to "1", reverting to "0" at t7.

Initially, the rate of rise of the radiation at 0.9 microns is sufficient to hold signal D at "1", but at time t8, it has started to fall sufficiently for signal D to go to "0". At time t10, however, it has started to level off again, preparatory to rising once more, and signal D reverts to "1".

Signal E goes to "1" at time t11 when the hydrocarbon fire has caused the output of 4.4 microns to reach the saturation level.

Because time t11 is just before time t7, signal F remains at "1" after switching to that level at time t6.

The output at 0.9 microns never exceeds the saturation threshold and signal G therefore remains at "1".

The color temperature threshold is never exceeded and signals H and I therefore remain at "0". Signal J therefore remains continuously at "1".

At time t19, the output at 0.9 microns exceeds the mid threshold applied by the threshold unit 48 and signal K goes to "1". This switches signal L to "0" at time t19 where it remains for the fixed period of 9 milliseconds, reverting to "1" at time t21. Signal K reverts to "0" at time t20, and then goes back to "1" at time t20a. For the reasons already explained under Case III, however, neither of these changes has any effect.

Analysis of the waveforms of FIG. 4B shows that signal M does not go to "1" until time t10. This is when the signal D reverts to "1" as the 0.9 micron detector begins to be affected by the hydrocarbon fire. 2 milliseconds later, at time t22, signal N goes to "1", producing the FIRE signal.

It will be apparent that signal D is at the "1" level up to time t8, and for the short period of time between t1 and t8, signal M could go to "1"—except for the effect of the mid threshold unit 48 and the monostable 72. However, even without the latter two units, the resultant "1" level signal M would not produce a FIRE signal—because this would be prevented by the delay unit 80.

Case IVA

The changes which this Case makes to the waveforms of FIGS. 4A and 4B are shown dotted.

It is now assumed that the armor pierced by the exploding H.E.A.T. round reacts pyrophorically. The effect of this is shown dotted in waveform W1 in FIG. 4A. Thus, the source of radiation now being viewed by the detectors has a higher color temperature and there is therefore more radiation at 0.6 microns than before. The relative amounts of radiation at 0.9 and 4.4 microns are not significantly affected.

As shown by the dotted waveforms in FIG. 4B, therefore, the effect is to cause signal H to go to "1" at time t14 when the color temperature exceeds the color temperature threshold. At time t15, signal H reverts to "0". Signal I therefore goes to "1" at time t14. Signal J therefore goes to "0" at time t14 and switches back to "1" at time t15.

As before, signal M goes to "1" at time t10 causing signal N to produce a FIRE signal at time t22.

Therefore, the only effective difference between this Case and Case IV is that some additional protection against production of a FIRE warning before the hydrocarbon fire has actually started is provided by the color temperature threshold unit 60.

Case V

In this Case, there is no exploding H.E.A.T. round or any hydrocarbon fire. However, it is assumed that the detectors are in such a position that they are not protected from inadvertently "seeing" the muzzle flash from a gun, for example the gun carried by the vehicle itself which might be a battle tank.

As shown in the waveforms of FIG. 5A, such a muzzle flash has a relatively high color temperature thus producing significantly more radiation at 0.6 than at 0.9 microns—though the absolute amounts of radiation produced at these wavelengths are relatively low. A significant amount of radiation is also produced at 4.4 microns.

Because the absolute level of radiation produced at 0.9 microns is not very great, the integrator 50 (FIG. 1) does not increase the varying pan fire threshold very substantially.

At time t1 (FIG. 5B) it is assumed that the output of the 4.4 micron detector exceeds the pan fire threshold and signal A goes to "1".

At time t3, the output at 0.9 microns exceeds the fixed pan fire threshold and signal B goes to "1". At time t4, the output at 0.9 microns falls below the moving pan fire threshold and signal B reverts to "1". The dotted line shows that it would not revert to "0" until time t5 if the only threshold applied by unit 40 was the basic pan fire threshold.

At time t6, the rate of rise at 4.4 microns exceeds the threshold and signal C goes to "1", reverting to "0" at time t7.

The rapid rate of rise at 0.9 microns initially holds signal D at "1". At time t8, however, it is falling sufficiently to switch signal D to "0". At time t10, however, it has fallen substantially to zero and signal D goes to "1".

The output at 4.4 microns never exceeds the saturation threshold and signal E remains at "0". Signal F therefore follows signal C.

The output at 0.9 microns is continuously below the saturation level and signal G remains at "1".

At time t14, the color temperature exceeds the color temperature threshold and signal H goes to "1", falling back to "0" at time t15.

Therefore, at time t14 signal I goes to "1". Signal J therefore falls from "1" to "0" at time t14, reverting to "1" at time t15.

The mid-threshold applied by unit 48 is never exceeded and signal K therefore remains at "0" throughout. Signal L therefore remains at "1" throughout.

The waveforms of FIG. 5B show that no FIRE signal is ever produced. This is mainly prevented by the color temperature threshold unit 60 which holds signal J at "0" between times t14 and t15. By time t15, the output at 0.9 microns has started to fall sufficiently to switch signal D to "0" thus preventing signal M going to "1". Although at time t10 signal D reverts to "1", by this time the rate of rise at 4.4 microns has fallen below the threshold and signal C has gone to "0" and the output at 0.9 microns has fallen below the pan fire threshold and signal B has gone to "0" also. Therefore, no signal M can be produced.

Case VI

In this Case, the detectors are not viewing the exploding H.E.A.T. round directly but some of its radiation reaches the detectors. Furthermore, burning fragments of the round may come into view of the detectors. The overall effect is to produce detector outputs (FIG. 6A) which have some similarity with those in the Case I situation (see FIG. 2A) but in which the rises of the outputs at 0.6 and 0.9 microns are relatively prolonged, although not reaching such high levels as in the Case I situation.

As shown in FIG. 6B, at time t1 signal A goes to "1" as the output at 4.4 microns exceeds the pan fire threshold. At time t3 the output at 0.9 microns exceeds the fixed pan fire threshold and signal B goes to "1". At time t4 the output falls below the varying pan fire threshold and signal B reverts to "0". The dotted line shows that the output at 0.9 microns does not fall below the basic pan fire threshold until time t5.

At time t6, the output at 4.4 microns exceeds the rate of rise threshold and signal C goes to "1", reverting to "0" at time t7.

The initial rate of rise of the output at 0.9 microns is sufficient to hold signal D at "1" from time zero and the relatively prolonged rise at this wavelength holds the signal at "1" until time t8. As shown, this occurs at about 12 milliseconds—and this is in practice found to be the "worst case"—that is, the latest that the reversion of signal D to "0" is likely to occur. At time t10, the output at 0.9 microns has levelled off sufficiently to cause signal D to switch back to "1".

Signal E is never switched to "1". Signal F therefore follows signal C.

Signal G is held continuously at "1" because the output of 0.9 microns never exceeds the saturation threshold.

The color temperature threshold is not exceeded and therefore signals H and I remain at "0" and signal J is held continuously at "1".

The output at 0.9 microns exceeds the mid-threshold at time t19. Signal L is therefore switched to "0" at time t19 and held there for the fixed period of 9 milliseconds, reverting to "1" at time t21.

Analysis of the logic waveforms of FIG. 6B therefore shows that signal M goes to "1" at time t21, when signal L reverts to "1". However, almost immediately, that is at time t8, signal M switches back to "0". The elapsed time between t21 and t8 is substantially less than 2 milliseconds and signal N therefore never goes to "1" and no FIRE signal is produced.

As stated above, FIG. 6B shows the "worst case" for the reversion of signal D to "0" at time t8. In practice, t8 is therefore likely to occur before t21 and signal M would therefore never go to "1".

It will be apparent that it is the mid-threshold unit 48 and the monostable 72 which provide primary protection against the incorrect production of a FIRE signal in the Case VI situation. In other words, it prevents the prolongation of the rise of the radiation at 0.9 microns from causing incorrect production of a FIRE signal. It does this by supplementing the 2 millisecond delay period of delay unit 80 with a further 9 millisecond delay period.

Case VII

This is the situation where the detectors view a growing standard hydrocarbon pan fire of at least a predetermined final size and within a predetermined distance—corresponding to the pan fire threshold applied by unit 20 and the basic pan fire threshold applied by unit 40. Signals A and B therefore go to "1". As the fire is growing, signals C and D will therefore go to "1" and remain there. Signal F will correspond with signal C because the saturation thresholds are not exceeded and signal E is therefore held at "0" and signal G at "1". The color temperature threshold is not exceeded and signal H is therefore held at "0" and signal J at "1". The mid threshold is not exceeded and signal K is therefore held at "0" and signal 1 at "1".

Therefore, signal M goes to "1" and is held there indefinitely. Signal N therefore goes to "1" to produce a FIRE signal.

Case VIII

This corresponds to Case VII in that the detectors are viewing a growing standard pan fire. However, in this case, it is assumed that the pan fire is being viewed in conditions of sunlight.

Therefore, signal H goes to "1" because of the high color temperature of the sunlight, and thus signal J goes to "0" for the 1 second period of monostable 54. Signal M is thus prevented from going to "1" for 1 second. However, at the end of this 1 second period, signal I reverts to "0" and signal J therefore goes to "1" even though the color temperature is still exceeding the threshold. On exposure to the growing panfire, therefore, all conditions as described above for Case VII exist and signal M now goes to "1" and after a further 2 milliseconds signal N goes to "1" producing the FIRE signal.

Therefore, the monostable 54 ensures that the system is able to produce a FIRE alarm (after 1 second) in conditions of continuous sunlight—and yet is still able to use high color temperature as a means of discriminating against (that is not producing a FIRE signal) in the various conditions described above where this is blocked by signal J (Case V in particular).

Case IX

This has been described above.

Lines 55 (FIG. 1) prevents monostable 54 from being switched to set signal I to "1" if signal B is at "0" so that monostable 54 cannot be enabled by spurious low intensity signals.

It will be appreciated that it would theoretically be possible to dispense with the 2 millisecond delay 80 and possibly to compensate by increasing the 9 millisecond period of monostable 72 to 11 milliseconds. However, it is advantageous to use the arrangement shown in FIG. 1 because the 2 millisecond delay 80 gives the system better noise immunity. For example, if because of noise AND gate 28 triggered signal M to "1" momentarily, the 2 millisecond delay 80 would prevent signal N going to "1" (assuming that the noise did not hold signal M at "1" for more than 2 milliseconds).

If desired, a second AND gate 28 could be provided which would be connected in parallel to receive all the inputs of the first AND gate 28, with the exception of its signal B. Instead, the signal B for the second AND gate would be provided from a second pan fire threshold unit 40 which would be connected in parallel to the first unit 40 but would have a lower pan fire threshold. The second AND gate would supply its signal M to its own 2 millisecond delay corresponding to delay 80.

Therefore, the only difference in the operation of the second AND gate and the second 2 millisecond delay would be that the latter would produce a FIRE signal for a lower threshold at 0.9 microns than for the first AND gate 28 and its delay 80. The FIRE signal produced by the second AND gate and its 2 millisecond delay could therefore be arranged to give merely a fire warning and not actually to initiate fire suppression. That would be the function of the first FIRE signal.

It would be appreciated that many modifications may be made to the system described without departing from the spirit or scope of the invention as defined in the appended claims.

What is claimed is:

1. A fire or explosion detection system for discriminating between radiation produced by a source of fire or explosion to be detected and radiation produced by a source of fire or explosion not to be detected, comprising first and second radiation detecting means respectively responsive to radiation in first and second wavelength bands the second of which is a characteristic wavelength band for a source of fire or explosion to be detected and operative to produce first and second radiation-intensity-dependent electrical signals respectively, output means connected to monitor the first and second signals and operative, unless inhibited by an inhibiting signal, to produce a fire or explosion indicating output only when, for at least a predetermined period of time, the magnitudes of both the first and second signals exceed respective first and second predetermined thresholds and the magnitude of at least said first signal is not falling at more than a predetermined rate, inhibiting means operative to monitor the color temperature of the radiation source viewed by the first and second radiation detecting means to produce an inhibiting signal when the color temperature exceeds a predetermined color temperature threshold, and means connecting the inhibiting signal to inhibit the output means.

2. A system according to claim 1, in which the inhibiting means comprises a third radiation detecting means responsive to radiation in a third wavelength band to produce a third-radiation-intensity-dependent electrical signal, the third wavelength band being so selected in relation to the said first wavelength band that a comparison of the first and third signals produces an output dependent on color temperature and comparing means operative to compare the first and third signals to produce the said inhibiting signal.

3. A system according to claim 2, in which the comparison means comprises means for measuring the ratio of the first and third signals.

4. A system according to claim 3, in which the comparison means comprises logarithmic amplifying means for respectively logarithmically amplifying the first and third electrical signals and difference means for measuring the difference between the outputs of the two logarithmic amplifying means whereby to produce an output whose anti-logarithm is dependent on the ratio of the first and third electrical signals, and means responsive to the anti-logarithm of the output of the difference means to produce the said inhibiting signal.

5. A system according to claim 1, including timing means connected to be responsive to the production of the said inhibiting signal and to cancel the inhibiting signal after a predetermined time from its initial production so as then to permit production of the fire or explosion indicating output by the output means even when the said color temperature exceeds the predetermined color temperature threshold.

6. A system according to claim 1, including means operative to produce an inhibiting signal, for inhibiting the output means, when the rate of rise of the said second radiation-intensity-dependent signal does not exceed a predetermined value.

7. A system according to claim 1, in which the output means includes first and second threshold means, the first threshold means being connected to receive the first radiation-intensity-dependent signal and to compare its magnitude with the said first predetermined threshold, and the second threshold means being connected to receive the second-radiation-intensity-dependent signal and to compare its magnitude with the said second predetermined threshold.

8. A system according to claim 7, including modifying means responsive to the said first radiation-intensity-dependent electrical signal and connected to the first threshold means to increase the predetermined value of the said first threshold so that it is higher after the first radiation detecting means has responded to radiation than it is before the first radiation detecting means has so responded.

9. A system according to claim 8, in which the said modifying means comprises means responsive to the time integral of the first radiation-intensity-dependent signal.

10. A system according to claim 1, in which the output means comprises a logic gate, and time delay means connected to receive the output of the logic means and operative to produce the said fire or explosion indicating output only when the output of the logic means has a predetermined logic value for at least the said predetermined period of time.

11. A system according to claim 1, in which the said first wavelength band includes a wavelength at which fire or explosion source not to be detected produces significant radiation.

12. A system according to claim 1, including inhibiting means responsive to the said first radiation-intensity-dependent signal to produce an inhibiting signal when the magnitude of the first radiation-intensity-dependent signal reaches a level corresponding to electrical saturation of the first radiation detecting means, and means connecting this inhibiting signal to inhibit the output means.

13. A fire or explosion detection system for discriminating between radiation produced by a source of fire or explosion to be detected and radiation produced by a source of fire or explosion not to be detected, comprising first radiation detecting means responsive to radiation at a wavelength at which radiation is produced by a source not to be detected and operative to produce a first radiation-intensity-dependent electrical signal, second radiation detecting means responsive to radiation at a wavelength characteristic of a fire or explosion source to be detected and operative to produce a second radiation-intensity-dependent electrical signal, first threshold means connected to receive the first radiation-intensity-dependent signal and operative to produce a first threshold signal when the magnitude of the first radiation-intensity-dependent signal exceeds a first predetermined threshold, second threshold means connected to receive the second radiation-intensity-dependent signal and operative to produce a second threshold signal when the magnitude of the second radiation-intensity-dependent signal exceeds a second threshold value, first rate of change means connected to receive the first-radiation-intensity-dependent signal and operative to produce a first rate of change signal when the first radiation-intensity-dependent signal is not falling at more than a predetermined rate of fall, second rate of change means connected to receive the second radiation-intensity-dependent signal and operative to produce an enabling signal when the second radiation-intensity-dependent signal is rising at at least a predetermined rate of rise, color temperature means responsive to the color temperature of the source of fire or explosion and operative when a predetermined color temperature threshold is exceeded to produce a color temperature signal lasting thereafter during the continuance of the color temperature above the predetermined color temperature threshold but for not more than a predetermined relatively long period of time, logic means connected to receive the first and second threshold signals, the first rate of change signal, the said enabling signal and the color temperature signal so as to produce a predetermined logic output only when the first and second threshold signals, the first rate of change signal and the said enabling signal all simultaneously exist and the color temperature signal is absent, and time delay means responsive to the predetermined logic output and operative to produce a fire or explosion indicating output only when the said predetermined logic output is maintained for at least a predetermined relatively shorter period of time.

14. The system according to claim 13, in which the color temperature means comprises third radiation detecting means responsive to radiation at a third wavelength to produce a third-radiation-intensity-dependent electrical signal, the third wavelength being so selected in relation to the said first wavelength that the ratio of the first and third signals produces an output dependent on color temperature, and comparing means operative to compare the first and third signals to produce the color temperature signal dependent on the ratio of the first and third signals.

15. A system according to claim 14, in which the comparison means comprises logarithmic amplifiers for respectively logarithmically amplifying the first and third electrical signals and difference means for measuring the difference between the outputs of the two logarithmic amplifying means whereby to produce an output whose anti-logarithm is dependent on the ratio of the first and third electrical signals, and means responsive to the anti-logarithm of the output of the difference means to produce the said inhibiting signal.

16. A system according to claim 13, including inhibiting means responsive to the said first radiation-intensity-dependent signal to produce an inhibiting signal when the magnitude of the first radiation-intensity-dependent signal reaches a level corresponding to electrical saturation of the first radiation detecting means, and means connecting this inhibiting signal to the logic means to inhibit the production of the predetermined logic output.

17. A system according to claim 13, including modifying means responsive to the integral of the said first radiation-intensity-dependent electrical signal to increase the value of the said first predetermined threshold so that it is higher after the first radiation detecting means has responded to radiation than it is before the first radiation detecting means has so responded.

18. A system according to claim 17, including saturation threshold means responsive to the magnitude of the said second radiation-intensity-dependent signal to produce a saturation signal only when the magnitude exceeds a predetermined relatively high value, and means connected to the saturation threshold means and to the second rate of change means so as to produce the said enabling signal only when the second radiation-intensity-dependent signal is rising at at least the predetermined rate of rise or the said saturation signal exists.

19. A fire or explosion detection system for discriminating between radiation produced by a source of fire or explosion to be detected and radiation produced by a source of fire or explosion not to be detected, comprising first and second radiation detecting means respectively responsive to radiation at first and second wavelengths, the first of which is a wavelength produced by a source not to be detected, to produce first and second radiation-intensity-dependent electrical signals respectively, output means connected to monitor the first and second radiation-intensity-dependent electrical signals and operative, unless inhibited by an inhibiting signal, to produce a fire or explosion indicating output only when, for at least a predetermined period of time, the magnitudes of both the first and second radiation-intensity-dependent electrical signals exceed respective first and second predetermined thresholds and the magnitude of at least the first radiation-intensity-dependent signal is not falling at more than a predetermined rate, means connected to receive the first radiation-intensity-dependent electrical signal and to produce a medium threshold signal if the magnitude of the first radiation-intensity-dependent signal exceeds a predetermined threshold higher than the said first threshold, inhibiting means responsive to initial production of the said medium threshold signal to produce an inhibiting signal for a predetermined duration, and means connecting the inhibiting signal to inhibit the output means for the said duration.

20. A system according to claim 19, including rate of rise means responsive to the rate of rise of the said second radiation-intensity-dependent signal to produce a rate of rise signal only when the rate of rise exceeds a predetermined value, saturation threshold means responsive to the magnitude of the said second radiation-intensity-dependent signal to produce a saturation signal only when the magnitude exceeds a predetermined relatively high value, and means responsive to the rate of rise signal and the saturation signal to produce a further said inhibiting signal only when neither the rate of rise signal nor the saturation signal exists.

21. A system according to claim 19, including means operative to produce a further inhibiting signal, for inhibiting the output means, when the rate of rise of the said second radiation-intensity-dependent signal does not exceed a predetermined value.

22. A system according to claim 19, including modifying means responsive to the said first radiation-intensity-dependent electrical signal to increase the predetermined value of the said first threshold so that it is higher after the first radiation detecting means has responded to radiation than it is before the first radiation detecting means has so responded.

23. A system according to claim 24, in which the said modifying means comprises means responsive to the time integral of the first radiation-intensity-dependent signal.

24. A system according to claim 19, including inhibiting means responsive to the said first radiation-intensity-dependent signal to produce a further inhibiting signal when the magnitude of the first radiation-intensity-dependent signal reaches a level corresponding to electrical saturation of the first radiation detecting means, and means connecting this inhibiting signal to inhibit the output means.

25. A system according to claim 19, in which the output means comprises a logic gate, and time delay means connected to receive the output of the logic means and operative to produce the said fire or explosion indicating output only when the output of the logic means has a predetermined logic value for at least the said predetermined period of time.

26. A system according to claim 19, in which the said second wavelength is a wavelength characteristic of a fire or explosion source to be detected.

27. A system according to claim 19, including further inhibiting means operative to monitor the color temperature of the radiation received by the first and second radiation detecting means to produce a further inhibiting signal when the color temperature exceeds a predetermined threshold, and means connecting the further inhibiting signal to inhibit the output means.

28. A system according to claim 27, in which the inhibiting means comprises third radiation detecting means responsive to radiation at a third wavelength to produce a third-radiation-intensity-dependent electrical signal, the third wavelength being so selected in relation to the said first wavelength that a comparison of the first and third signals produces an output dependent on color temperature, and comparing means operative to compare the first and third signals to produce the said further inhibiting signal.

29. A system according to claim 28, in which the comparison means comprises means for measuring the ratio of the first and third signals.

30. A system according to claim 29, in which the comparison means comprises logarithmic amplifying means for respectively logarithmically amplifying the first and third electrical signals and difference means for measuring the difference between the outputs of the two logarithmic amplifying means whereby to produce an output whose anti-logarithm is dependent on the ratio of the second and third electrical signals, and means responsive to the output of the difference means to produce the said further inhibiting signal.

31. A system according to claim 27, including timing means connected to be responsive to the production of the said further inhibiting signal and to cancel the further inhibiting signal after a predetermined time from its initial production so as then to permit production of the fire or explosion indicating output by the output means even when the said color temperature exceeds the predetermined color temperature threshold.

32. A system according to claim 31, including rate of rise means responsive to the rate of rise of the said second radiation-intensity-dependent signal to produce a rate of rise signal only when the rate of rise exceeds a predetermined value, saturation threshold means responsive to the magnitude of the said second radiation-intensity-dependent signal to produce a saturation signal only when the magnitude exceeds a predetermined relatively high value, and means responsive to the rate of rise signal and the saturation signal to produce a further said inhibiting signal only when neither the rate of rise signal nor the saturation signal exists.

* * * * *